T. A. WILLARD.
STORAGE BATTERY ADAPTED PARTICULARLY FOR AEROPLANES.
APPLICATION FILED AUG. 27, 1917.
1,327,650.
Patented Jan. 13, 1920.
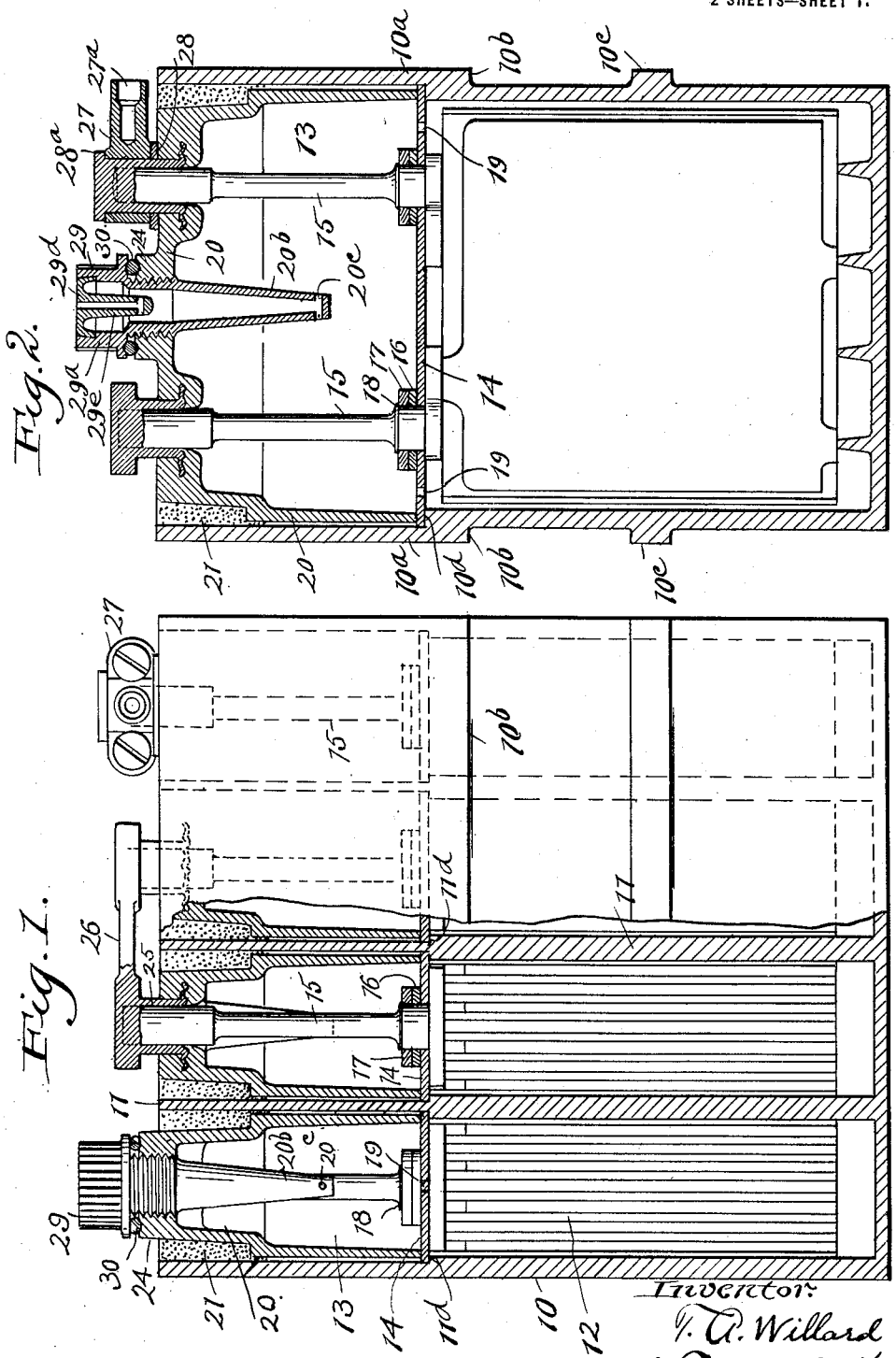

T. A. WILLARD.
STORAGE BATTERY ADAPTED PARTICULARLY FOR AEROPLANES.
APPLICATION FILED AUG. 27, 1917.

1,327,650.

Patented Jan. 13, 1920.
2 SHEETS—SHEET 2.

Inventor:
T. A. Willard
by Thurston & Kwis

UNITED STATES PATENT OFFICE.

THEODORE A. WILLARD, OF EAST CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY ADAPTED PARTICULARLY FOR AEROPLANES.

1,327,650.      Specification of Letters Patent.      Patented Jan. 13, 1920.

Application filed August 27, 1917. Serial No. 188,298.

*To all whom it may concern:*

Be it known that I, THEODORE A. WILLARD, a citizen of the United States, residing at East Cleveland, in the county of Cuyahoga and State of Ohio, have invented a certain new and useful Improvement in Storage Batteries Adapted Particularly for Aeroplanes, of which the following is a full, clear, and exact description.

This invention relates to storage batteries and has for its object the provision of a storage battery which is adapted particularly for aeroplane use. It is the aim of this invention to provide a construction such that should the battery be turned on its side or upside down, the acid will not be lost or escape from the battery through the vent plug as would result with a storage battery of ordinary construction, but on the other hand the battery will not be adversely affected and will even continue to operate or discharge for a time after being turned to the extent stated from its normal substantially upright position, and when restored to normal position will operate precisely as before.

I attain this main object by providing at the top of the jar or container, a chamber or compartment separated from the compartment which contains the battery elements, this chamber being constructed so as to slowly receive and to retain without loss in any manner whatsoever, the acid which runs into the chamber when the battery is turned on its side or inverted. This chamber, which is preferably formed by a specially constructed and extended cover with a skirt which extends well down from the top of the battery, and a diaphragm or sub-cover which is between the cover proper and the elements of the battery, this chamber being acid tight except for the small openings which are provided in the diaphragm for the escape of gas from the battery and to permit the slow passage of acid into or from the chamber when the battery is turned, and except for the vent plug which is specially constructed to avoid loss of acid even when the acid of the battery flows into this chamber.

The invention may be further briefly summarized as consisting in certain novel details of construction and combinations and arrangements of parts which will be described in the specification and set forth in the appended claims.

Figure 3:
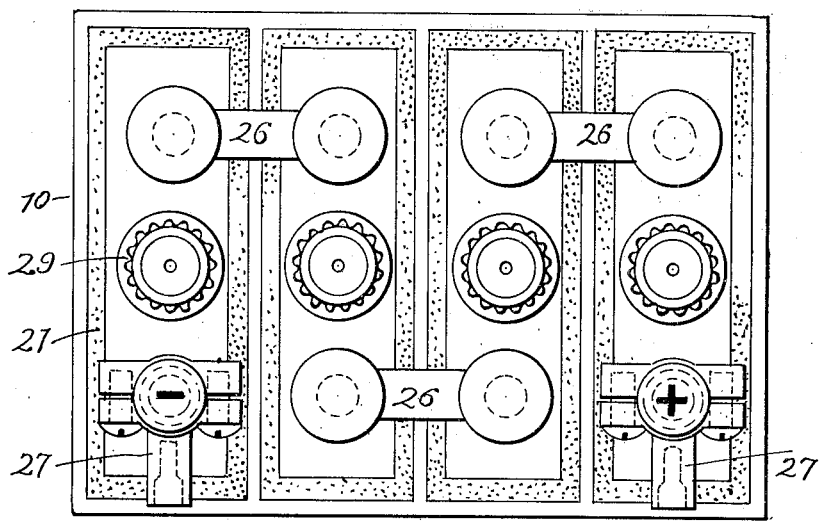
Figure 4:
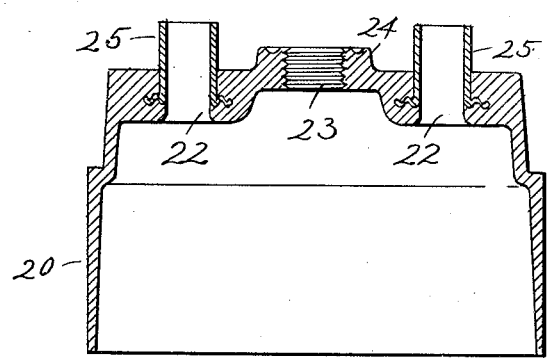
Figure 5:
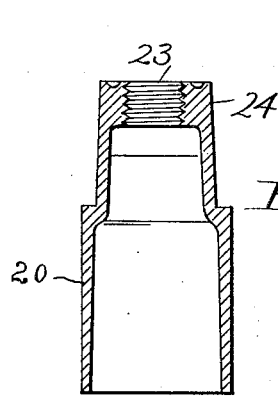

In the accompanying sheet of drawings wherein I have shown the preferred form of my invention, Figure 1 is a partial side view and partial longitudinal sectional view of the battery; Fig. 2 is a transverse sectional view through one of the cells; Fig. 3 is a top plan view; Fig. 4 is a sectional view through a cover of one of the cells showing the sealing sleeves before being attached to the terminal posts; and Fig. 5 is a central transverse sectional view of the same.

I prefer to use only one container for my improved battery, this being the jar 10 which is preferably a multi-compartment jar of hard rubber designed to be directly clamped to the frame of an aeroplane, this jar having along its sides lateral offset portions $10^a$ forming along the sides external shoulders $10^b$, and having beneath these shoulders, ribs $10^c$, which with the shoulders $10^b$ form grooves for securing clamps by which the battery as a whole is secured in place on the aeroplane. It might be here mentioned that this jar having the features above mentioned, and others to be referred to presently, constitutes the subject matter of a companion application and will therefore not be specifically claimed herein.

The jar has a plurality of compartments which are formed by partitions 11, there being, of course, one compartment for each cell. It will be understood, of course, that the number of compartments and cells may be varied to suit requirements.

Each compartment of the jar contains the usual positive and negative plates and separators, all of which are indicated generally by the reference character 12, these elements resting on customary ribs at the bottom of the cell.

Ordinarily the plates extend well up toward the top of a cell, but in this case the compartments of the jar are made considerably higher than is ordinarily the case, and I provide at the top of each compartment, that is, above the plates of each cell, a chamber which is indicated by the reference character 13, which chamber is acid proof except for openings to be referred to presently, and is of sufficient size to receive the acid of the cell in the event the cell is turned completely upside down as it may in practice when used on an aeroplane, and I accomplish this in such a way that even though the battery is turned upside down the acid will run from the compartment or chamber containing the plates, so slowly that the battery will continue to discharge for the period of time that the aeroplane is likely to be in the extreme abnormal position. This chamber 13 of each cell is formed in part by a diaphragm 14 which extends completely across the cell just above the plates, this diaphragm resting on, and being cemented around its perimeter to shoulders 10$^d$ which extend completely around the cell just above the external shoulders 10$^b$, these shoulders being formed in part by the lateral or offset portions 10$^a$, and being formed in part in the ends of the jar and in the partitions.

Each diaphragm 14 has openings through which the positive and negative terminal posts 15 extend, these posts extending up through the chamber 13, and through the cover, and therefore being much longer than customary. The openings of the diaphragm through which the posts extend are carefully sealed against leakage of acid by packing disks 16 which are slipped onto the posts and are preferably cemented to the diaphragms, and by lead washers 17 which press the soft flexible disks or washers down tightly onto the diaphragm, this being accomplished by peening over portions of the terminal posts just above the washers 17, as shown at 18. This peening of the posts over the washers 17 clamps the diaphragm, packing disks 16 and washers 17 down tightly against the straps from which the posts extend.

Additionally each diaphragm has one or more, preferably two small openings 19 through which the acid may slowly run from the lower chamber containing the plates to the upper chamber 13 when the battery is turned sufficiently from normal upright position. The gassing normally takes place through these openings, and furthermore in flushing the battery the water runs through them into the chamber beneath the diaphragm. It might be said at this point, that in flushing the battery water will be added until the lower chamber is completely filled, then any excess above the diaphragm will generally be removed by a hydrometer syringe.

It will be seen from the above that the diaphragm 14 forms the base of the chamber 13. The remaining part of this chamber is formed by the cell cover 20 which is provided with a long depending skirt extending down inside the jar compartment, and at its bottom edge engages the diaphragm and clamps the same onto the shoulders 11$^d$. The bottom edge of the cover 20 firmly engages the diaphragm, and it is preferably cemented thereto so as to form an acid tight joint. This cover is fastened in position in the customary manner by sealing compound 21 which is poured into the space between the upper part of the cover and the surrounding portion or top of the jar.

The cover 20 is provided with two openings through which the terminal posts extend, these openings being most clearly shown in Fig. 4, and additionally it is provided midway between the openings 22 with a threaded opening 23 for a vent plug, this opening being formed in a boss 24 which extends slightly above the remaining portion of the cover. The posts are fastened to the cover so as to form acid tight joints, and this is preferably accomplished by means of lead sealing sleeves 25 which at their lower ends are embedded in the cover. These sealing sleeves which extend up to or slightly beyond the upper ends of the posts are lead burned to the upper ends of the posts and also to the cross-connectors which are shown at 26, thus forming in effect an integral structure of the cross-connectors, posts and sealing sleeves so that the leakage of acid around the posts is impossible. This feature or detail of the structure is not claimed herein, but constitutes the subject matter of a prior application, Serial No. 71,142, filed January 10, 1916, for storage batteries. The two end or terminal connectors which are shown at 27 are clamped about the sealing sleeve, each of these connectors being in the form of a two part clamp secured together by screws, and one part having an extension with a socket 27$^a$ adapted to receive the end of a flexible conductor. This terminal connector 27 is very firmly held between a yieldable washer 28 which rests on the top of the cover and the upper end of the integrally united corresponding terminal post and sealing sleeve, this integrally united structure being peened over the connector 27 forming a shoulder shown at 28$^a$ in Fig. 2.

Still another feature which is important to the attainment of the desired results is the special vent plug 29 which is screwed into the opening 23 of the cover previously referred to. This vent plug comprises an upper head 29$^a$ with a threaded portion screwed into the threaded boss of the cover and with a long downwardly extending hollow tapered projection 20$^b$ which extends part way down toward the diaphragm and is provided at its lower end with one or more openings 20$^c$. Additionally the vent plug is provided at its upper end with a cap or plug 29$^d$ which is tightly fitted into the upper central opening of the plug and has a central downwardly extending projection 29$^e$ through which there extends a passageway for the escape of gas, the lower end of the passageway which is at the lower end of the projection being some distance below the extreme top of the vent plug. Between the threaded boss 24 which receives the vent plug and the flanged lower part of the vent plug head 29ª is a circular gasket 30 which is seated in grooves in the opposing faces of the boss and vent plug head, and which when compressed between the boss and the vent plug head forms an effective seal against leakage of acid at this point.

This battery operates in the following manner. When the battery is in upright position it acts as a normal battery, the latter gassing through the openings 19 of the diaphragm and through the vent plug. If the battery is turned from normal position, say sidewise or to inverted position, the acid runs slowly through the diaphragm openings 19 into what is normally the upper chamber 13, but as before stated, the battery will continue to discharge for a considerable time after it has been turned to this abnormal position, because the acid passes from between the elements of the cell at a slow rate, due to the small size of the openings 19. No acid can pass from the chamber 13, not only because of the acid proof character of this chamber, but because under these conditions the lower end, or what was formerly the lower end of the vent plug opening 20ᶜ is above the level of the acid in the chamber 13, this effect or result being obtained by the long downward extension 20ᵇ of the vent plug. And if the battery is then restored to normal position, not only will the acid then slowly return to the lower chamber, but the vent plug extension is of such a length that the lower end 20ᶜ of the vent plug opening will then also be above the level of the acid in the chamber 13, so that no acid can be forced out through the vent plug by the gas which may have collected in the cell.

As previously stated, this construction does not prevent the escape of gas from the battery while operating normally, and the battery can be flushed in the ordinary manner by removing the vent plug and pouring the water in the vent plug opening, the water passing through the openings 19 of the diaphragm in the manner previously explained.

It might be stated further, that when the battery is tipped up, any drops or particles of acid which may have accumulated on the walls of the vent plug from the gas may run down into the compartment or space surrounding the upper middle projection 19ᵉ of the vent plug, and cannot run out of the vent plug, this being the particular advantage of the projection 29ᵉ of the vent plug.

I may, if desired, give the chamber 13 sufficient capacity to receive without leakage, all the electrolyte normally contained in the lower chamber, or only a portion of the electrolyte. In practice it is only necessary that each chamber 13 be sufficiently large to hold without leakage the acid or electrolyte which will run into the chamber during the time that the aeroplane in which the battery is used, is liable to be in an extreme abnormal position. Usually while the plane is in the air it soon rights itself after flying in inverted position, or in some other extreme abnormal position, and it is only necessary that the upper chamber have sufficient capacity to receive and to hold without leakage the acid which runs from the lower chamber into the upper chamber during such period of time. However, as before stated, I may construct, and it is within the scope of my invention to construct the battery with the several chambers 13 of sufficient capacity to receive and hold all the electrolyte of the several cells.

While I have shown the preferred form of my invention, I do not desire to be confined to the exact details shown, but aim in my claims to cover all modifications which do not involve a departure from the spirit and scope of my invention.

Having described my invention, what I claim is:

1. In a storage battery, a container having a lower chamber containing the battery plates and an electrolyte, and an upper chamber, said upper chamber comprising a diaphragm extending across the container above the plates, and a cover having an integral extension resting on said diaphragm, said upper chamber being adapted to receive and hold the electrolyte when the battery is inverted or otherwise turned from normal upright position.

2. A storage battery comprising a container having a lower chamber containing battery plates and an electrolyte, and an upper chamber, said upper chamber comprising a diaphragm extending across the container above the plates, and a cover having an integral skirt extending down in the container to the diaphragm.

3. A storage battery comprising a container having a lower chamber containing battery plates and an electrolyte, and an upper chamber, said upper chamber comprising a diaphragm extending across the container above the plates, a cover having an integral skirt extending down in the container to the diaphragm, said diaphragm and cover having openings through which the terminal posts of the battery extend, and said diaphragm having one or more openings through which the electrolyte may run from one chamber to the other.

4. A storage battery jar having partitions forming compartments each having internal shoulders at a distance from the top, a diaphragm seated on the shoulders of a compartment, and a deep cover extending from the top of the jar downward and resting on the diaphragm.

5. A multi-compartment battery jar having lateral walls and dividing partitions, there being in each compartment on all four sides thereof and at a distance from the top, internal shoulders, a diaphragm resting on the shoulders of each compartment, and a cover extending downward from the top of the compartment and engaging the diaphragm.

In testimony whereof, I hereunto affix my signature.

THEODORE A. WILLARD.